No. 791,360. PATENTED MAY 30, 1905.
R. NELSON.
OILING DEVICE.
APPLICATION FILED SEPT. 19, 1903.

No. 791,360. Patented May 30, 1905.

UNITED STATES PATENT OFFICE.

RICHARD NELSON, OF LOS ANGELES, CALIFORNIA.

OILING DEVICE.

SPECIFICATION forming part of Letters Patent No. 791,360, dated May 30, 1905.

Application filed September 19, 1903. Serial No. 173,861.

*To all whom it may concern:*

Be it known that I, RICHARD NELSON, a citizen of the United States, residing at Los Angeles, in the county of Los Angeles, State of California, have invented new and useful Improvements in Oiling Devices, of which the following is a specification.

My invention relates to means to oil the axle of a running-gear; and the object thereof is to provide simple and efficient means to keep the axle supplied with the necessary lubricant to prevent it from unduly heating and to make it run easy. I accomplish these objects by the mechanism described herein, and illustrated in the accompanying drawings, which show my device applied to a carriage-wheel, and in which—

Figure 1:
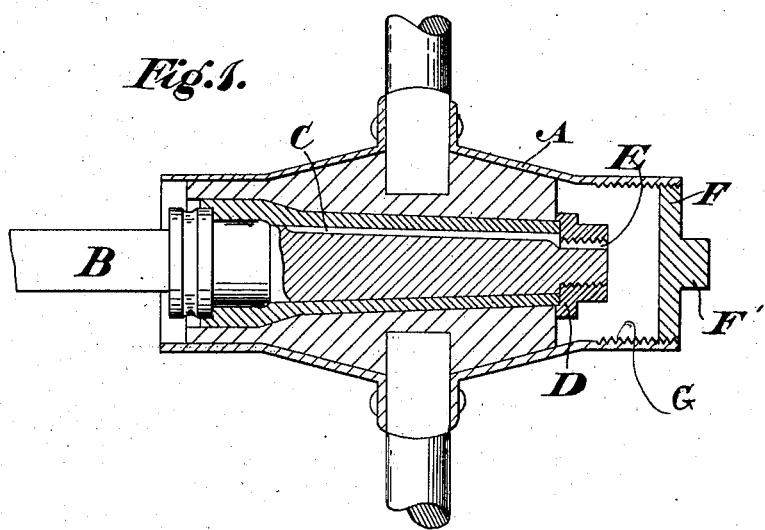
Figure 2:
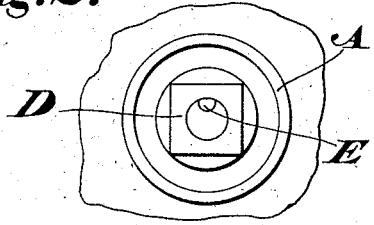

Figure 1 is a side elevation, partly in central longitudinal section, of a portion of the axle and hub, showing my oiling device applied thereto. Fig. 2 is an end view of a portion of the hub with the follower removed.

In the drawings, A represents the hub of a carriage-wheel of ordinary construction.

B is the axle, provided with the lubricant-groove C in the top thereof, which is in communication with channel E, which runs to the outer end of the axle through nut D, which is screwed upon the end of the axle to hold the hub in place thereon. The outer end of the hub always projects beyond the nut on the end of the axle and is always of metal. This projecting part is interiorly threaded by threads G, in which the externally-screw-threaded follower F works. After the wheel is secured upon the axle I fill the projecting end of the hub nearly full of axle-grease (not shown) and screw the follower into the end of the hub a sufficient distance to force the necessary amount of grease into the lubricant-channel to properly lubricate the wheel, the square boss F' providing means to turn the same with a wrench. Thereafter when more grease is needed it is only necessary to give the follower a partial turn to force more grease into the lubricant-channel. It will be seen that by this construction a sufficient quantity of lubricant is available at all times to properly lubricate the axle and that all that is necessary to do is to give the follower a sufficient rotation to force the desired quantity of lubricant into the lubricant-groove, where it is applied in the usual manner. It will also be observed that it is not necessary to remove the wheel from the axle in order to oil it and that therefore no wagon-jacks are necessary and that by this method of oiling the axle the lubricant is more evenly applied thereto than would be the case if the wheel were removed and then slipped back.

Having described my invention, what I claim as new, and desire to secure by Letters Patent, is—

The combination with an axle having a lubricating-groove therein which extends to the end of the axle thereby forming an outlet at that point, of a hub mounted on the axle, a nut screwed on the end of the axle for holding the hub thereon and through which nut the lubricating-groove extends, the hub having a protruding outer end which extends beyond the nut whereby a lubricant-chamber is formed, this protruding end of the hub internally screw-threaded, and a threaded follower screwed into the threaded end of the hub and capable of forcing the lubricant into the groove of the axle.

In witness that I claim the foregoing I have hereunto subscribed my name this 11th day of September, 1903.

RICHARD NELSON.

Witnesses:
G. E. HARPHAM,
G. E. WINTON.